US 6,700,294 B2

(12) United States Patent
Horng et al.

(10) Patent No.: US 6,700,294 B2
(45) Date of Patent: Mar. 2, 2004

(54) POLE PLATE ASSEMBLY FOR A STATOR OF A MOTOR

(75) Inventors: Alex Horng, Kaohsiung (TW); Ching-Shen Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 66 days.

(21) Appl. No.: 10/022,202

(22) Filed: Dec. 20, 2001

(65) Prior Publication Data
US 2003/0117252 A1 Jun. 26, 2003

(51) Int. Cl.⁷ .................................................. H02K 7/00
(52) U.S. Cl. ........................ 310/259; 310/216; 310/217; 310/218; 310/257; 310/254
(58) Field of Search ................................. 310/216, 217, 310/218, 257, 254, 258, 259; 360/99.08, 99.04, 99.09

(56) References Cited

U.S. PATENT DOCUMENTS

| 4,987,331 A | * | 1/1991 | Horng | 310/254 |
| 6,270,325 B1 | * | 8/2001 | Hsieh | 417/423.12 |
| 6,441,531 B1 | * | 8/2002 | Horng et al. | 310/216 |
| 6,512,320 B2 | * | 1/2003 | Horng et al. | 310/259 |

* cited by examiner

*Primary Examiner*—Nicholas Ponomarenko
*Assistant Examiner*—Leda Pham
(74) *Attorney, Agent, or Firm*—Bacon & Thomas, PLLC

(57) ABSTRACT

A stator includes a bobbin, plural pole plates, and an axle tube. Half of the plural pole plates are mounted on top of the bobbin and the other half of the plural pole plates are mounted to a bottom of the bobbin. The axle tube is extended through the pole plates and the bobbin to form a stator having four or eight poles. Each of the pole plates has a single pole end and single pole face extending from the pole end.

7 Claims, 6 Drawing Sheets

POLE PLATE ASSEMBLY FOR A STATOR OF A MOTOR

BACKGROUND OF THE INVENTION

1. Field of the Invention

The present invention relates to a pole plate assembly for a stator of a motor. In particular, the present invention relates to a pole plate assembly that has plural stacked pole plates having an increased overall thickness to avoid leakage of magnetic flux and to increase the rotational output torque. In addition, the number of pole faces is arranged in the most effective manner and the overall thickness of the respective pole face is decreased to reduce the radial dimension of the stator.

2. Description of the Related Art

FIG. 7 of the drawings illustrates a conventional stator of a motor. The stator comprises a bobbin 700, two pole plates 710, and an axle tube 720. Each pole plate 710 has two pole ends 711 each having a pole face 712 extending along a plane perpendicular to a generally plane of the respective pole plate 710. The axle tube 720 extends through the pole plates 710 and the bobbin 700 to thereby form a stator having four poles. When electric current is passed through the winding of the stator, the magnetic flux (magnetic lines) created by the winding is guided by the axle tube 720 and to pass through the pole plates 710 to each of the pole faces 712, thereby driving a permanent magnet on a rotor with the magnetic field created on the respective pole face 712. In physical properties, the amount of the magnetization or the magnetic dipole moment of the respective pole plate 710 is constant such that each pole plate 710 is magnetized by the axle tube 720 to a fixed extent. Therefore, the output torque of the stator to the rotor is not substantially increased and the rotational efficiency of the motor is reduced if the number of the pole faces 712 is increased for each pole plate 710. In brief, it is improper to arrange too many pole faces 712 on the respective pole plate 710. On the other hand, a single pole plate 710 cannot assure reliable guide of the magnetic field intensity in the axle tube 720 to the pole plate 710 without leakage of the magnetic flux. Thus, it is theoretically necessary to increase the number of pole plates in order to increase the guide effect of the magnetic flux on the axle tube 720. On the other hand, one must consider the total number of the pole plates while selecting the number of the pole faces on a pole plate so as to determine the most efficient number of the pole faces. For example, when manufacturing a four-pole motor with four pole plates, the most efficient number of the pole face is one (1) for each pole plate, and when manufacturing an eight-pole motor with four pole plates, the most efficient number of the pole faces is two (2).

FIG. 8 shows another conventional stator of a motor. The stator comprises a bobbin 800, two pole plates 810, and an axle tube 820. Each pole plate 810 includes four pole ends 811 and four pole faces 812 to thereby form a stator having eight poles. Compared with the stator shown in FIG. 7, even the number of the pole ends and the number of the pole faces for the respective pole plate are both increased, it was found that the output torque for driving the motor rotor was not increased significantly, as the sectional thickness of the respective pole plate was not increased at the same time.

SUMMARY OF THE INVENTION

A first object of the present invention is to provide a pole plate assembly for a stator of a motor, wherein the number of the pole plates of the pole plate assembly is increased to increase the total magnetic flux guided through the pole plates, thereby increasing the output torque for driving the rotor.

A second object of the present invention is to provide a pole plate assembly for a stator of a motor, wherein the number of each pole plate of the stator plate assembly is selected to be the most efficient to thereby reduce the overall thickness of the respective pole face. The radial dimension of the motor stator is reduced accordingly.

A stator in accordance with the present invention comprises a bobbin, plural pole plates, and an axle tube. A half of the plural pole plates is mounted on top of the bobbin and the other half of the plural pole plates is mounted to a bottom of the bobbin. The axle tube is extended through the pole plates and the bobbin to form a stator having four or eight poles. The magnetization is increased and the magnetic flux leakage is reduced by means of the increased overall thickness of the pole plates. The effective guided magnetic flux to the respective pole plate is gained. In addition, the radial dimension of the stator is reduced, as each pole plate is provided with the most efficient number of pole face(s) and the overall thickness of the respective pole face is reduced.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Figure 1:
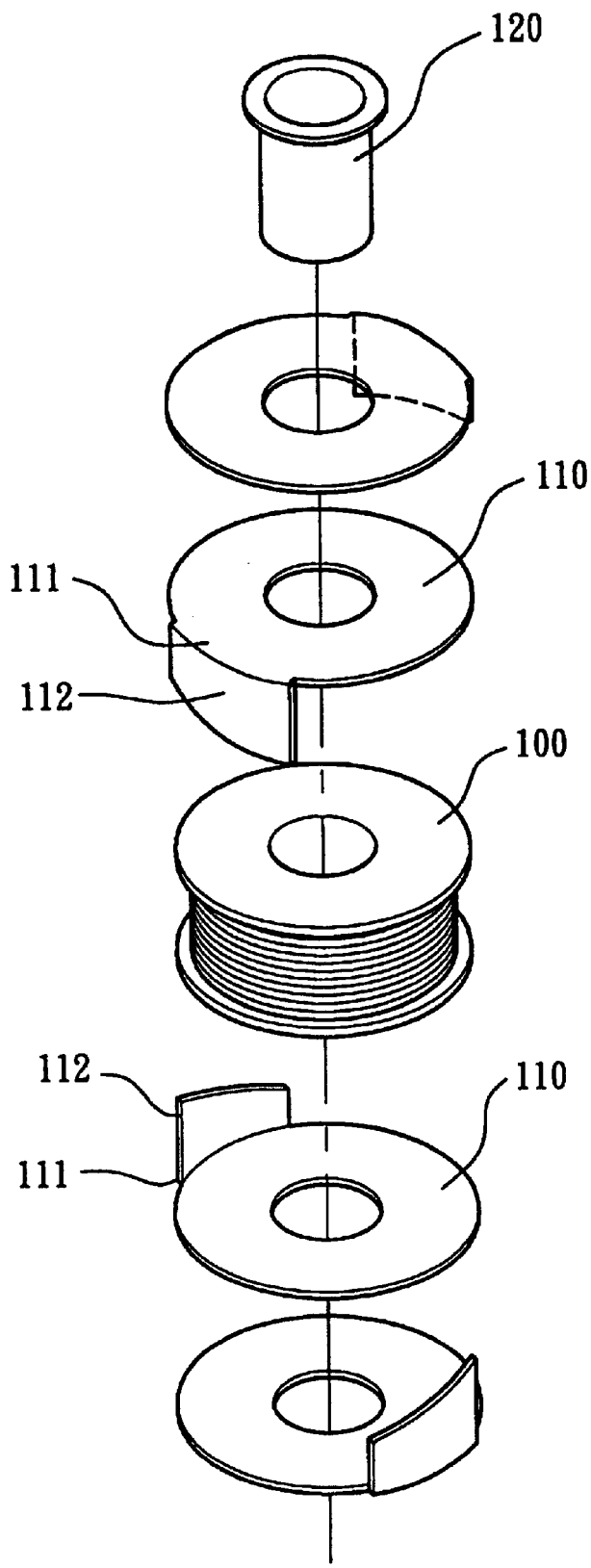
FIG. 1 is an exploded perspective view of a first embodiment of a stator having a pole plate assembly in accordance with the present invention.
Figure 2:
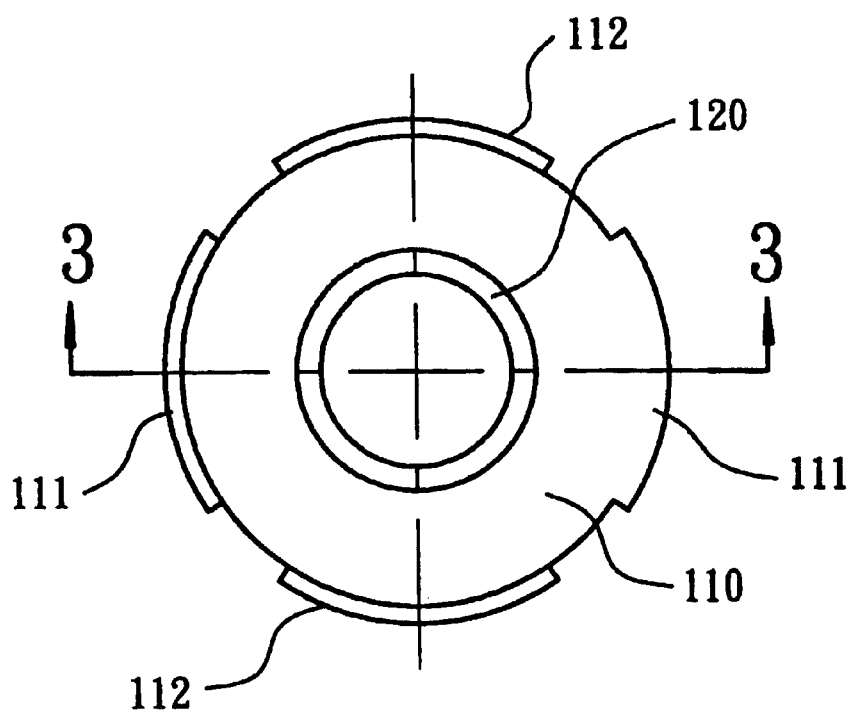
FIG. 2 is a top view of the stator in FIG. 1.
Figure 3:
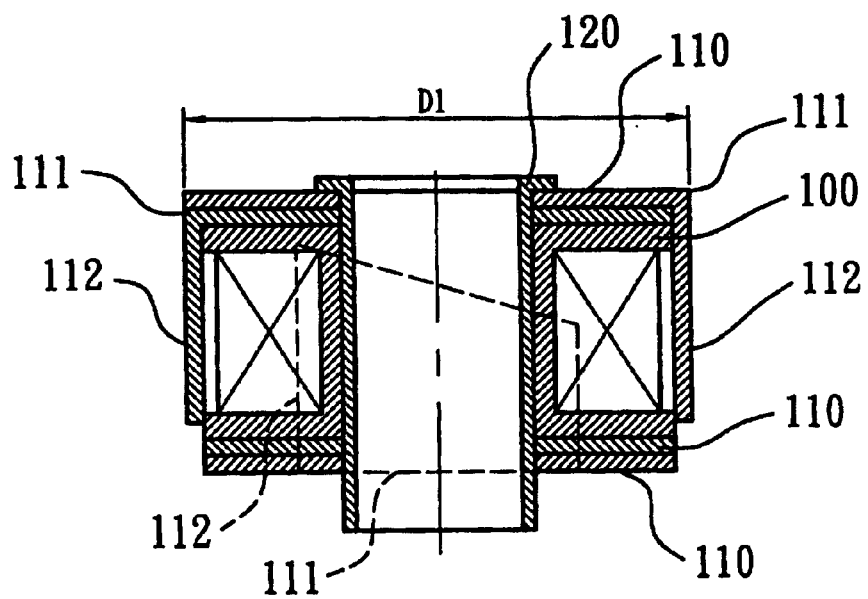
FIG. 3 is a sectional view taken along line 3—3 in FIG. 2.

Referring to FIGS. 1 through 3, a stator in accordance with the present invention generally comprises a bobbin 100, four pole plates 110, and an axle tube 120. An axial winding (not labeled) is wound around the bobbin 100. Preferably, each pole plate 110 includes a single pole end 111 having a single pole face 112 extending along a plane perpendicular to a general plane of the respective pole plate 110. An overall thickness of the pole face 112 of the respective pole plate 110 is not reduced after stacking of the pole plates 110. Preferably, the pole face 112 of the respective pole plate 110 has an inclined side or is configured as a trapezoid to prevent generation of dead angle for starting.

In assembly, two of the pole plates 110 are mounted on top of the bobbin 100 and the other two pole plates 100 are mounted to the bottom of the bobbin 100 with the pole faces 112 of the upper pole plates 110 mounted on top of the bobbin 100 being diametrically opposed to each other and with the pole faces 112 of the lower pole plates 110 mounted to the bottom of the bobbin 100 being diametrically opposed to each other. Next, the axle tube 120 is extended through the pole plates 110 and the bobbin 100 to form a stator having four poles with the pole faces 112 being spaced at 90° interval. Thus, the overall thickness of the pole plates 110 is increased, as there are two pole plates 110 mounted on top of the bobbin 100 and two pole plates 110 mounted to the bottom of the bobbin 100. This increases the contact area between the axle tube 120 and the pole plates 110 for magnetic flux conduction and thus assures increased magnetization by means of reliable guide of the magnetic flux on two ends of the axle tube 120 to the pole plates 110. Leakage of the magnetic flux is thus reduced, and the effective guided overall magnetic flux conducted to the respective pole face 112 is gained. As a result, the output torque for driving the motor rotor is increased. On the other hand, since each pole plate 110 has only one pole face 112 (which is the most efficient), the overall thickness of the respective pole face 112 is reduced and the radial dimension D1 (see FIG. 3) of the stator of the motor is reduced in addition to the effective driving for the rotor.

Figure 4:
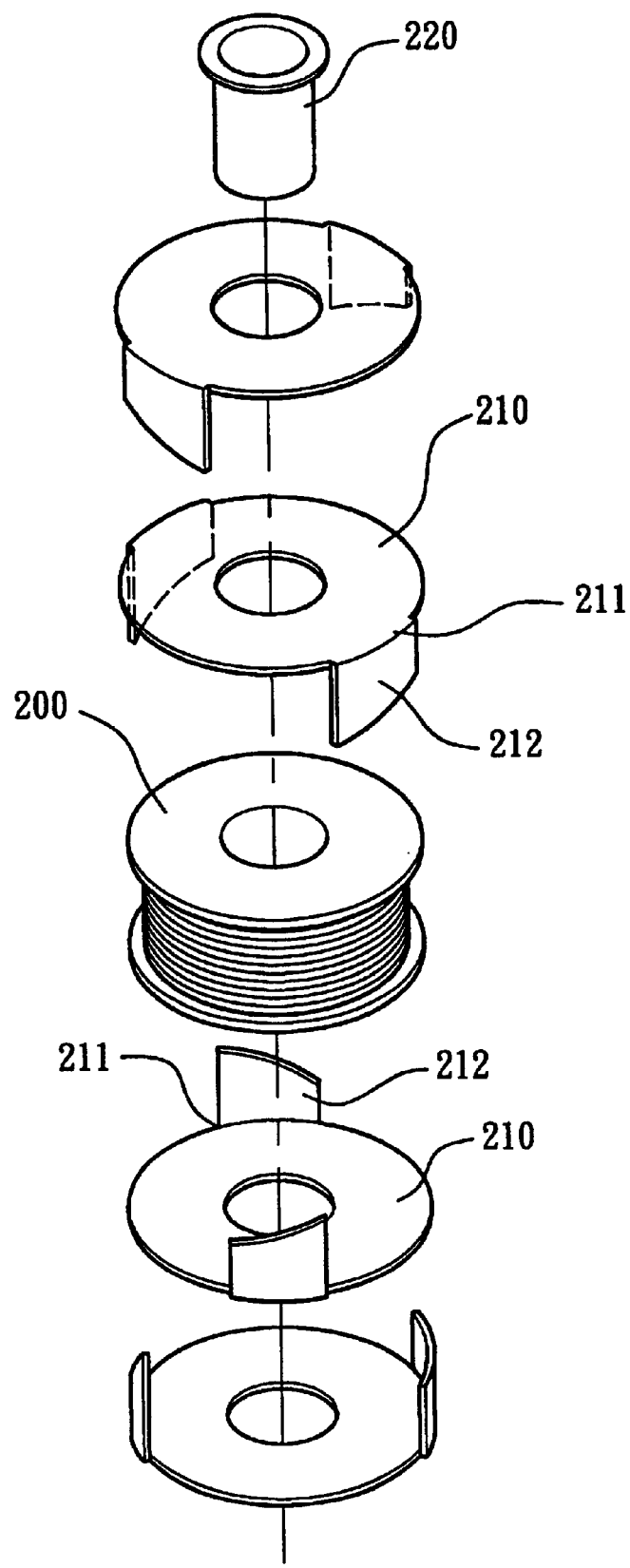
FIG. 4 is an exploded perspective view of a second embodiment of a stator having a pole plate assembly in accordance with the present invention.
Figure 5:
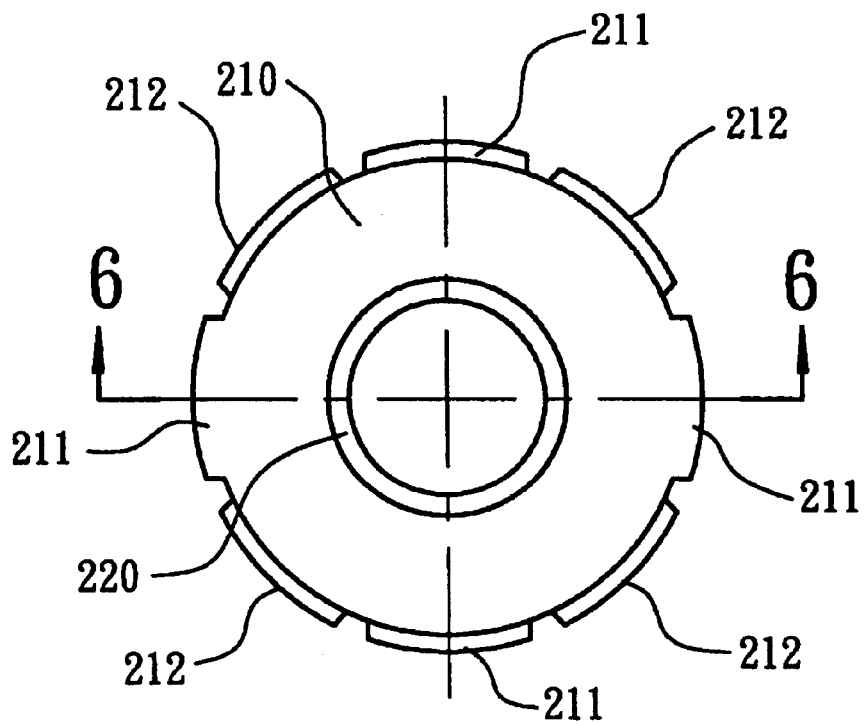
FIG. 5 is a top view of the stator in FIG. 4.
Figure 6:
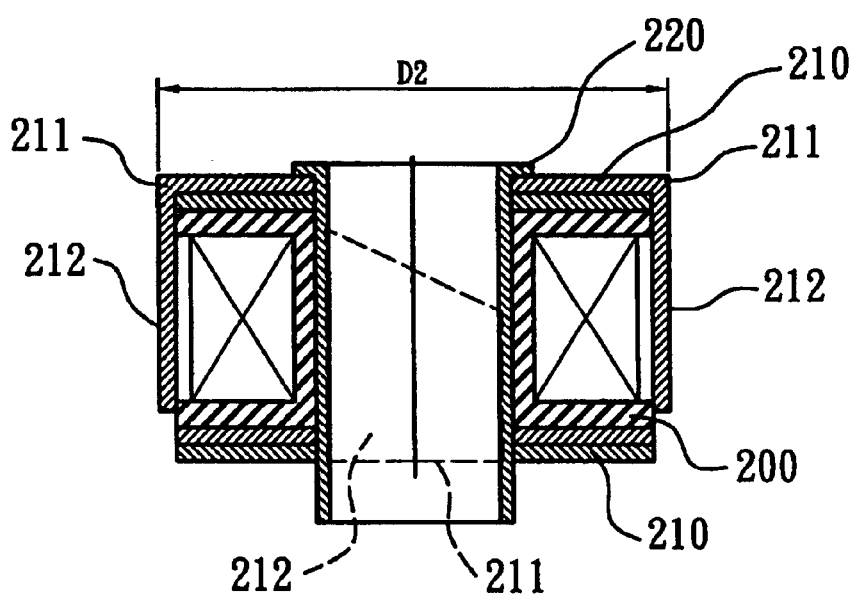
FIG. 6 is a sectional view taken along line 6—6 in FIG. 5.
Figure 7:
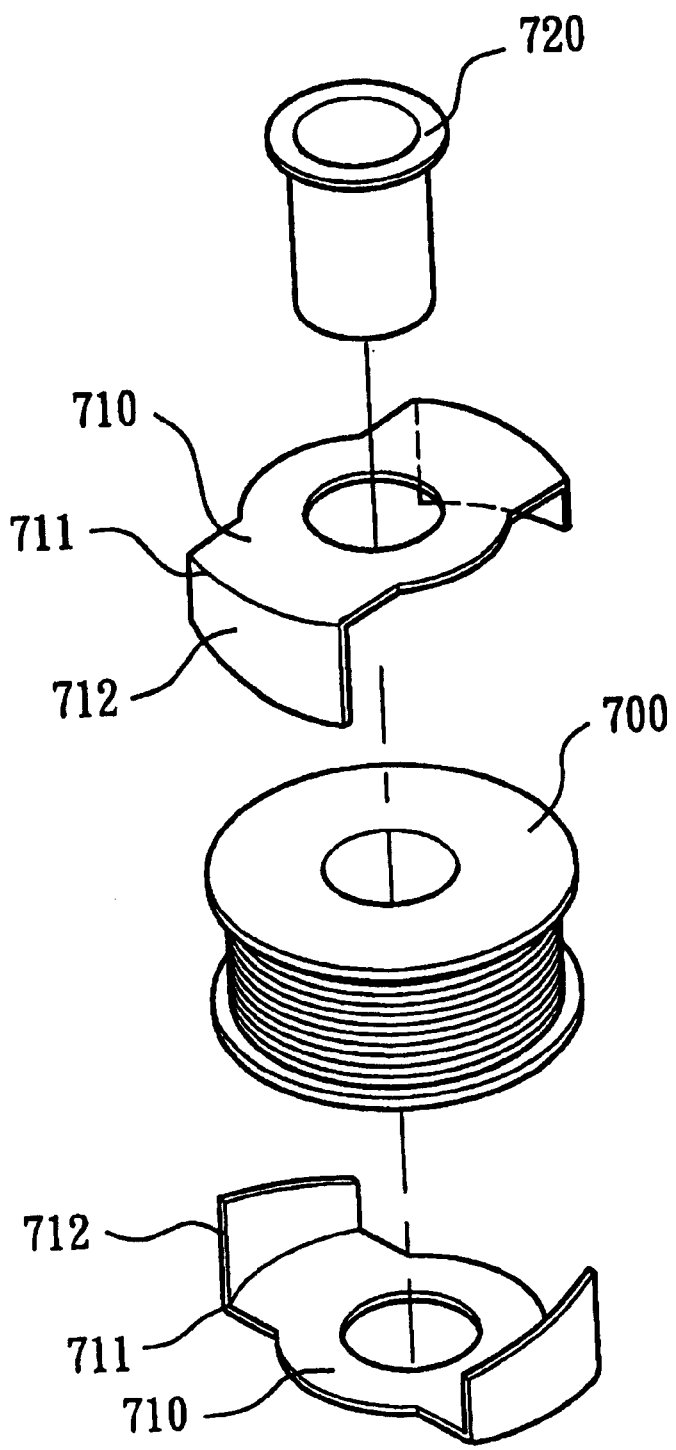
FIG. 7 is an exploded perspective view of a conventional stator.

Refer to FIGS. 4 through 6 illustrating the second embodiment of a stator in accordance with the present invention. In order to eliminate the problem of excessively increased overall thickness of the pole plates when using eight pole plates 110 in the first embodiment to construct an eight-pole stator, in this embodiment, the number of the pole plates 210 is reduced to four, and each of the pole plates 210 has two diametrically opposed pole ends 211 each having a pole face 212 extending along a plane perpendicular to a general plane of the respective pole plate 210.

In assembly, two of the pole plates 210 are mounted on top of a bobbin 200 and the other two pole plates 210 are mounted to the bottom of the bobbin 200 with the pole faces 212 of the upper pole plates 110 mounted on top of the bobbin 200 being alternately disposed and with the pole faces 212 of the lower pole plates 210 mounted to the bottom of the bobbin 200 being alternately disposed. Next, an axle tube 220 is extended through the pole plates 210 and the bobbin 200 to form a stator having eight poles with the pole faces 112 being spaced at 45° interval. Compared with the conventional eight-pole stator in FIG. 8 having four-pole-face pole plates 812 and having a diameter of "D8", the overall thickness of the pole plates 210 for conducting the magnetic flux is doubled, as there are two pole plates 210 mounted on top of the bobbin 200 and two pole plates 210 mounted to the bottom of the bobbin 200. This increases the magnetization and decreases the magnetic flux leakage. The magnetic flux conducted to the respective pole plate 210 is gained, but the overall thickness of the respective pole face 212 is not increased when compared with the conventional design, as each pole plate 210 has only two pole faces 212. In addition, the radial dimension "D2" (see FIG. 6) of the stator of the motor in accordance with the present invention is equal to that "D8" of the conventional design.

Figure 8:
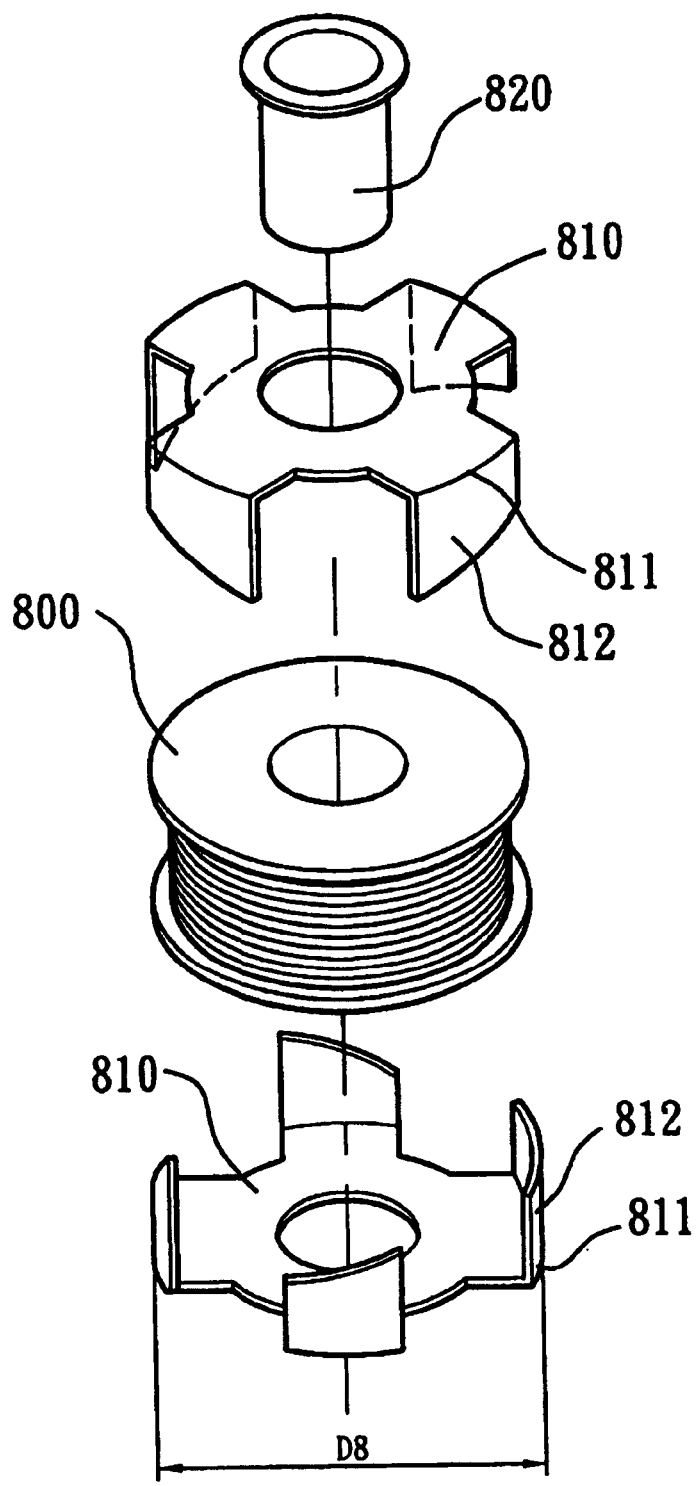
FIG. 8 is an exploded perspective view of another conventional stator.

Referring to FIGS. 1, 4, and 8, the pole plate assembly for a stator of a motor in accordance with the present invention increases the magnetization and reduces the magnetic flux leakage by means of increasing the number of the pole plates. The effective guided overall magnetic flux is gained while each pole plate is provided with the most efficient number of pole face(s) to reduce the total number of the pole faces and the thickness of the respective pole face that are not advantageous, thereby reducing the radial dimension of the motor stator. By contrast, the conventional pole plate assembly for a stator motor increases the pole faces on each pole plate without increasing the overall thickness of the pole plates. The effective guided overall magnetic flux is not increased, as the magnetization of the pole plates is not increased and the magnetic flux leakage is not reduced.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A stator comprising:

a bobbin having an axial winding wound therearound;

plural single pole plates each having a pole end, each said single pole end having a single pole face extending from the pole end;

an axle tube extending through the bobbin and said plural single pole plates, the axle tube conducting magnetic flux created by the winding to said plural single pole plates;

a half of said plural single pole plates being stacked and mounted on top of the bobbin and another half of said plural single pole plates being stacked and mounted to a bottom of the bobbin, the number of the half of said plural single pole plates mounted on top of the bobbin being not less than two, the number of the half of said plural single pole plates mounted to the bottom of the bobbin being not less than two, thereby increasing magnetization, reducing magnetic flux leakage, and gaining effectively guided overall magnetic flux by means of increasing an overall thickness for effectively conducting the magnetic flux to said plural single pole plates.

2. The stator as claimed in claim 1, wherein there are two pole plates mounted to each of the top and the bottom of the bobbin to thereby form a stator having four poles.

3. The stator as claimed in claim 1, wherein there are three pole plates mounted to each of the top and the bottom of the bobbin to thereby form a stator having six poles.

4. The stator as claimed in claim 1, wherein the pole face of each of said plural pole plates extends along a plane perpendicular to a general plane of the respective pole plate.

5. The stator as claimed in claim 1, wherein the pole face of each of said plural pole plates includes an inclined side.

6. The stator as claimed in claim 1, wherein the pole face of each of said plural pole plates is a trapezoid.

7. The stator as claimed in claim 1, wherein said single pole faces of said single pole plates are staggered when assembled so as to achieve equal spacing between said pole ends.

* * * * *